United States Patent
Alkhalaf et al.

(10) Patent No.: US 11,453,816 B2
(45) Date of Patent: *Sep. 27, 2022

(54) ACCELERATED CEMENT COMPOSITIONS AND METHODS FOR TREATING LOST CIRCULATION ZONES

(71) Applicant: Saudi Arabian Oil Company, Dhahran (SA)

(72) Inventors: Sara A. Alkhalaf, Al-Khobar (SA); Abdullah S. Al-Yami, Dhahran (SA); Vikrant Wagle, Dhahran (SA); Abdulla Hussein Al-Awadh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 99 days.

This patent is subject to a terminal disclaimer.

(21) Appl. No.: 16/920,965

(22) Filed: Jul. 6, 2020

(65) Prior Publication Data

US 2022/0002611 A1    Jan. 6, 2022

(51) Int. Cl.
| | |
|---|---|
| *C09K 8/504* | (2006.01) |
| *C04B 22/14* | (2006.01) |
| *C04B 24/12* | (2006.01) |
| *C04B 28/02* | (2006.01) |
| *E21B 21/00* | (2006.01) |
| *E21B 33/138* | (2006.01) |
| *C04B 103/12* | (2006.01) |

(52) U.S. Cl.
CPC .......... *C09K 8/5045* (2013.01); *C04B 22/148* (2013.01); *C04B 24/122* (2013.01); *C04B 28/02* (2013.01); *E21B 21/003* (2013.01); *E21B 33/138* (2013.01); *C04B 2103/12* (2013.01)

(58) Field of Classification Search
CPC ....... C09K 8/48; C04B 14/308; C04B 22/148; C04B 24/122; C04B 28/04; C04B 2103/12; E21B 33/14; E21B 41/02
See application file for complete search history.

(56) References Cited

U.S. PATENT DOCUMENTS

| | | | |
|---|---|---|---|
| 2,437,842 A | 3/1948 | Uhler | |
| 2,761,843 A | 9/1956 | Brown | |
| 4,012,264 A | 3/1977 | Murray et al. | |
| 4,257,814 A * | 3/1981 | Kellet | C04B 40/0658 106/718 |
| 4,373,956 A | 2/1983 | Rosskopf | |
| 4,481,037 A | 11/1984 | Beale et al. | |
| 4,482,383 A | 11/1984 | Mckenzie | |
| 4,493,771 A | 1/1985 | Wilson et al. | |
| 4,515,708 A | 5/1985 | Haslegrave et al. | |
| 5,057,467 A | 10/1991 | Croft | |
| 5,450,900 A | 9/1995 | Schalla et al. | |
| 5,641,385 A | 6/1997 | Croft et al. | |
| 6,153,049 A | 11/2000 | Croft | |
| 6,312,560 B1 | 11/2001 | Croft | |
| 6,723,163 B1 | 4/2004 | Hofmann | |
| 7,617,870 B1 | 11/2009 | Roddy et al. | |
| 7,863,228 B2 | 1/2011 | Loper et al. | |
| 9,434,911 B2 | 9/2016 | Bennett et al. | |
| 9,617,185 B2 | 4/2017 | Ferrari et al. | |
| 9,617,461 B2 | 4/2017 | Nelson et al. | |
| 9,850,419 B2 | 12/2017 | Ballew et al. | |
| 10,144,860 B1 | 12/2018 | Reddy | |
| 2003/0152479 A1 | 8/2003 | Heuer et al. | |
| 2008/0289826 A1 | 11/2008 | Burts, Jr. et al. | |
| 2009/0194283 A1 | 8/2009 | Ermel et al. | |
| 2009/0200029 A1 * | 8/2009 | Roddy | C09K 8/467 106/707 |
| 2014/0190696 A1 * | 7/2014 | Iverson | C04B 24/003 106/676 |
| 2015/0197033 A1 * | 7/2015 | Agapiou | C09K 8/467 264/299 |
| 2016/0208158 A1 | 7/2016 | Monahan et al. | |
| 2016/0264465 A1 | 9/2016 | Wibowo et al. | |
| 2017/0210967 A1 | 7/2017 | Nelson et al. | |

(Continued)

FOREIGN PATENT DOCUMENTS

| | | | |
|---|---|---|---|
| CN | 106554765 A | 4/2017 | |
| CN | 105541158 B | 11/2017 | |

(Continued)

OTHER PUBLICATIONS

International Search Report and Written Opinion dated May 12, 2021 pertaining to International application No. PCT/US2020/066340 filed Dec. 21, 2020, 16 pgs.

(Continued)

*Primary Examiner* — Crystal J. Lee

(74) *Attorney, Agent, or Firm* — Dinsmore & Shohl LLP

(57) ABSTRACT

A method of treating a lost circulation zone in a wellbore includes contacting an accelerant composition comprising triethanolamine with a cement composition in the lost circulation zone, the cement composition comprising at least: from 1 weight percent (wt. %) to 90 wt. % cement precursor based on the total weight of the cement composition; and from 5 wt. % to 70 wt. % water based on the total weight of the cement composition; where a weight ratio of triethanolamine to the cement precursor is from 0.1 percent (%) to 60%; and curing the cement composition in the lost circulation zone to form a cured cement, where the triethanolamine accelerates the curing rate of the cement composition and the cured cement seals the lost circulation zone.

14 Claims, No Drawings

(56) References Cited

U.S. PATENT DOCUMENTS

2019/0106952 A1* 4/2019 Shine, Jr. ............... C09K 8/487
2019/0225542 A1* 7/2019 Patil ....................... C09K 8/845

FOREIGN PATENT DOCUMENTS

| GA | 794413 A | 9/1968 |
| WO | 2009103944 A1 | 8/2009 |
| WO | 2017034547 A1 | 3/2017 |
| WO | 2018144684 A1 | 8/2018 |
| WO | 2019074830 A1 | 4/2019 |

OTHER PUBLICATIONS

Rihan et al., "The Effect of Two Amine-Based Corrosion Inhibitors in Improving the Corrosion Resistance of Carbon Steel in Sea Water" ASM International, JMEPEG vol. 23, pp. 693-699, 2014.
International Search Report and Written Opinion dated Mar. 25, 2021 pertaining to International application No. PCT/US2020/063992 filed Dec. 9, 2020, 17 pgs.
Houska, "Deicing Salt—Recognizing the Corrosion Threat," International Molybdenum Association (2009), available at: https://www.imoa.info/download_files/stainless-steel/DeicingSalt.pdf (last accessed Nov. 10, 2020).
International Search Report and Written Opinion dated Jul. 1, 2021 pertaining to International application No. PCT/US2021/024401 filed Mar. 26, 2021, 17 pages.
U.S. Office Action dated Feb. 10, 2022 pertaining to U.S. Appl. No. 16/995,069, filed Aug. 17, 2020, 35 pages.

* cited by examiner

ACCELERATED CEMENT COMPOSITIONS AND METHODS FOR TREATING LOST CIRCULATION ZONES

TECHNICAL FIELD

Embodiments of the present disclosure generally relate to natural resource well drilling and, more specifically, accelerated cement compositions and methods for treating lost circulation zones with the accelerated cement composition.

BACKGROUND

Extracting subterranean hydrocarbon sources may require drilling a hole from the surface to the subterranean geological formation housing the hydrocarbons. Specialized drilling techniques and materials are utilized to form the wellbore hole and extract the hydrocarbons. A wellbore is a hole that extends from the surface to a location beneath the surface to permit access to hydrocarbon-bearing subterranean formations. The wellbore contains a fluid conduit that links the interior of the wellbore to the surface. The fluid conduit coupling the interior of the wellbore to the surface may be capable of permitting regulated fluid flow from the interior of the wellbore to the surface. The fluid conduit may also permit access between equipment on the surface and the interior of the wellbore. The fluid conduit may be defined by one or more tubular strings, such as wellbore casings for example, inserted into the wellbore and secured in the wellbore.

During drilling of a wellbore, cementing the wellbore, or both, lost circulation zones may be encountered that can result in loss of drilling fluid, cement, or other fluids. In a lost circulation zone, the drilling fluid, cement, or other fluid flows out of the wellbore and into the surrounding formation. Lost circulation zones may result in increased cost of the overall well through increased material costs to replace lost fluids and downtime to remediate the lost circulation zone. Lost circulation zones may be remediated by introducing a lost circulation material into the lost circulation zone to seal the lost circulation zone and prevent further fluid loss. Conventional lost circulation materials (LCM) can have a long cure time and are not acid-soluble.

SUMMARY

When lost circulation of drilling fluid is experienced, placing cement plugs in the wellbore may be a common initial solution. For example, drilling may be stopped and a cement plug may be placed in the lost circulation zone. Cement plugs for remediating lost circulation zones can be installed by pumping a cement composition into the lost circulation zone and allowing the cement to cure to form the cement plug. The cement plug provides a barrier that may reduce or prevent further fluid loss to the formation. The drill string can then be inserted back into the wellbore following installation of the cement plug. However, high cross flow rates in the formation may convey the cement further into the lost circulation zone before the cement can properly cure. Cement with normal cure times of up to 12 hours or even 24 hours may be washed out by cross flow before a large lost circulation zone can be adequately treated. Thus, treatment of the lost circulation zone may be time-consuming and costly using conventional cement compositions.

Conventional lost circulation materials, such as commercially available cement compositions, may be able to remediate many lost circulation zones. However, during subsequent drilling of the wellbore and hydrocarbon production using the well, conventional lost circulation materials used to isolate lost circulation zones often result in high fluid loss to the formation because of a long cure time. Additionally, in circumstances in which the commercially available cement compositions prematurely thicken and harden in the piping or coiled tubing used to dispense the cement into the lost circulation zone, the cured cements, which are not acid soluble, cannot be easily removed from the piping. Removal of cured cements from piping may require milling or cutting out the plugged section of the piping and replacing the piping. Remediating the problems caused by cement cured in the piping may cause delays in drilling.

Accordingly, ongoing needs exist for methods and accelerated cement compositions for treating a lost circulation zone, in particular, methods that incorporate accelerated cement compositions with accelerated curing rates and acid solubility. These needs are met by embodiments of the accelerated cement compositions and methods for treating lost circulation zones using the accelerated cement compositions described in the present disclosure. The accelerated cement compositions of the present disclosure include a cement composition comprising a cement precursor and water and an accelerant composition comprising triethanolamine, where the accelerant composition is present in an amount effective to accelerate curing of the accelerated cement compositions. The accelerated cement compositions may be pumped into the lost circulation zone and allowed to cure to treat the lost circulation zone. The accelerated curing rate of the accelerated cement compositions may enable the accelerated cement compositions to be used to treat large lost circulation and lost circulation zone with greater cross-flow rates. The triethanolamine of the accelerant composition may additionally provide anti-corrosion properties to the accelerated cement composition, which may operate to reduce corrosion of drill strings, pipes, and tubular strings installed in the wellbore. Additionally, the triethanolamine may increase the acid solubility of the accelerated cement composition compared to commercially available cements. The increased acid solubility of the accelerated cement compositions may enable the accelerated cement compositions to be more easily removed from pipes and drill strings in the event of premature curing of the accelerated cement compositions compared to commercially available cement compositions without the accelerant composition, among other features.

According to aspects of the present disclosure, a method of treating a lost circulation zone in a wellbore may include contacting an accelerant composition comprising triethanolamine with a cement composition in the lost circulation zone, the cement composition comprising at least: from 1 weight percent (wt. %) to 90 wt. % cement precursor based on the total weight of the cement composition; and from 5 wt. % to 70 wt. % water based on the total weight of the cement composition; where a weight ratio of triethanolamine to the cement precursor is from 0.1 percent (%) to 60%; and curing the cement composition in the lost circulation zone to form a cured cement, where the triethanolamine accelerates the curing rate of the cement composition and the cured cement seals the lost circulation zone.

According to other aspects of the present disclosure, an accelerated cement composition for treating a lost circulation zone in a wellbore may include a cement composition comprising from 1 wt. % to 90 wt. % cement precursor based on the total weight of the cement composition; and from 5 wt. % to 70 wt. % water based on the total weight of the cement composition. The accelerated cement composition may further include an accelerant composition comprising triethanolamine, where a weight ratio of triethanolamine to the cement precursor in the accelerated cement composition is from 0.1% to 60%.

Additional features and advantages of the described embodiments will be set forth in the detailed description that follows, and in part will be readily apparent to those skilled in the art from that description or recognized by practicing the described embodiments, including the detailed description, which follows as well as the drawings and the claims.

DETAILED DESCRIPTION

The present disclosure is directed to accelerated cement compositions and methods for treating lost circulation zones encountered during wellbore drilling with the accelerated cement compositions. The methods of the present disclosure for treating a lost circulation zone in a wellbore may include contacting an accelerant composition comprising triethanolamine with a cement composition in the lost circulation zone. The cement composition may include at least from 1 weight percent (wt. %) to 90 wt. % cement precursor based on the total weight of the cement composition; and from 5 wt. % to 70 wt. % water based on the total weight of the cement composition. A weight ratio of triethanolamine to the cement precursor may be from 0.1 percent (%) to 60%, which may be defined as the percent of triethanolamine based on the total weight of the cement precursor. The method of the present disclosure for treating a lost circulation zone in a wellbore may further include curing the cement composition in the lost circulation zone to form a cured cement, where the triethanolamine accelerates the curing rate of the cement composition and the cured cement seals the lost circulation zone. The method may incorporate accelerated cement compositions with accelerated curing rates and acid solubility.

The accelerated cement composition of the present disclosure for treating a lost circulation zone in a wellbore may include a cement composition and an accelerant composition. The cement composition may include from 1 wt. % to 90 wt. % cement precursor based on the total weight of the cement composition and from 5 wt. % to 70 wt. % water based on the total weight of the cement composition. The accelerant composition may include triethanolamine. A weight ratio of triethanolamine to the cement precursor may be from 0.1% to 60% by weight of cement. The accelerated cement composition may provide accelerated curing rates and may provide acid solubility to the accelerated cement compositions, which may make it easier to remove cured cement from drill strings, coiled tubing, or other piping systems used to dispense the accelerated cement composition into the lost circulation zone. The accelerated cement composition may also provide anti-corrosion properties to reduce corrosion of tubular strings and other metal components of the wellbore, among other features.

As used throughout this disclosure, the term "hydrocarbon-bearing formation" may refer to a subterranean geologic region containing hydrocarbons, such as crude oil, hydrocarbon gases, or both, which may be extracted from the subterranean geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery or reduction of water production.

As used throughout this disclosure, the term "fluid" may include liquids, gases, or both.

As used throughout the present disclosure, the term "spacer fluid" may refer to a fluid utilized to maintain separation between any two other materials utilized in well production, such as fluids that may be incompatible with each other, for example.

As used throughout the present disclosure, the term "displacement fluid" may refer to a fluid injected into the wellbore to displace a different fluid out of the wellbore and into the annulus or into a portion of the subterranean formation.

As used throughout the present disclosure, the term "cement precursor" may refer to any suitable material which, when mixed with water, may be cured into a cement. A cement precursor may be hydraulic or non-hydraulic.

As used throughout this disclosure, the term "cure" or "curing" may refer to providing adequate moisture, temperature and time to allow a cement or concrete to achieve the desired properties (such as hardness) for its intended use through one or more reactions between the water and the cement precursor.

As used throughout the present disclosure, the term "annulus" may refer to the volume defined between the exterior surface of a tubular string and the wellbore wall or an inner surface of another tubular string that surrounds to the tubular string. The term "annulus" may refer to the wellbore annulus, a casing-casing annulus, or both.

As used throughout the present disclosure, the term "by weight of cement" may refer to an amount of a constituent of the accelerated cement composition relative to the amount of the cement precursor in the accelerated cement composition and can be calculated by dividing the weight of the constituent by the total weight of the cement precursor in the accelerated cement composition. "By weight of cement" may be abbreviated using the acronym BWOC.

As used throughout the present disclosure, the term "substantially free" of a constituent in the composition means that the cement composition includes less than 0.1% BWOC of that constituent. When used outside the context of the cement composition, the term "substantially free" of a constituent refers to less than 0.1 weight percent (wt. %) of that component in a composition. For example, accelerant composition that is substantially free of aluminum sulphate may have less than 0.1 wt. % aluminum sulphate based on the total weight of the accelerant composition.

As used throughout the present disclosure, the term "cross-flow" may refer to the subterranean flow of fluids from one zone of a formation to another zone of a formation, such as fluid flow from a greater pressure formation zone to a lesser pressure formation zone.

As used throughout this disclosure, the term "high-injectivity zone" may refer to a lost circulation zone having an injectivity factor of less than or equal to 4000 pounds of force per square inch*min per barrel (psi*min/bbl) (or even less than or equal to 3000 psi*min/bbl), a fluid loss rate of greater than 100 barrels per hour, or both. As used in this disclosure, the term "barrel" refers to a unit of measure equal to 42 United States (U.S.) Gallons, which is equal to 0.159 cubic meters (where 1 U.S. gallon is equal to 0.003785 cubic meters). The injectivity factor is defined as the quotient of the injection pressure in pounds of force per square inch (psi) divided by the injection rate in barrels per minute (bbl/min). The fluid loss rate is the volume of fluid lost to the lost circulation zone per hour.

The wellbore forms a pathway capable of permitting both, fluids and apparatus to traverse between the surface and the hydrocarbon-bearing formation. Besides defining the void volume of the wellbore, the wellbore wall also acts as the interface through which fluid can transition between the subterranean formation and the interior of the well bore. The wellbore wall can be unlined (that is, bare rock or formation) to permit such interaction with the formation or lined, such as by a tubular string, so as to prevent such interactions.

The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. Example equipment connected at the surface to the fluid conduit includes pipelines, tanks, pumps, compressors, flares, or other production or injection equipment. The fluid conduit may be large enough to permit introduction and removal of mechanical devices, including but not limited to tools, drill strings, sensors, and instruments, into and out of the interior of the well bore.

The wellbore may be drilled using a drill string in the presence of a drilling fluid. The drill string may include a drill bit coupled to the downhole end of the drill string. While drilling the wellbore, the drilling operation may encounter a lost circulation zone. When a lost circulation zone is encountered during drilling, fluids in the wellbore flow from the wellbore into the subterranean formation, resulting in loss of these fluids. These fluids can include but are not limited to drilling fluids, sealing compositions, spacer fluids, wash fluids, preflush fluids, or displacement fluids. In some instances, lost circulation may be caused by the natural state of the subterranean formation through which the drilling passes. For example, the subterranean formation may be naturally fractured or may be an unconsolidated formation, such as but not limited to gravel, sand, pea, or combinations of these. Alternatively, in other circumstances, the hydrostatic pressure of the fluids in the wellbore may be greater than the fracture gradient of the subterranean formation, which may cause at least some breakdown of the pores in the formation. If the pores in the formation breakdown, then the pores may become large enough to reduce the resistance of the flow of fluids into the pores, which may result in the formation receiving fluids from the wellbore instead of resisting the flow of these fluids into the formation.

When lost circulation of drilling fluid is experienced, placing cement plugs in the wellbore may be a common initial solution. For example, drilling may be stopped and a cement plug may be placed in the lost circulation zone. Cement plugs for remediating lost circulation zones can be installed by pumping a cement composition into the lost circulation zone and allowing the cement to cure to form the cement plug. The cement plug may provide a barrier that prevents further fluid loss to the formation. The drill string may then be inserted back into the wellbore. However, as previously discussed, high cross flow rates of cement may convey the uncured cement farther into the lost circulation zone. Cement with normal cure times of up to 12 hours or even 24 hours may be washed out (lost to the lost circulation zone) before a large or high injectivity lost circulation zone can be adequately treated. Thus, treatment of the lost circulation zone may be time-consuming and costly using conventional cement compositions.

Lost circulation zones may be remediated by introducing a material into the subterranean formation in the lost circulation zone to seal the lost circulation zone from the wellbore by blocking flow pathways in the subterranean formation and preventing flow of fluids from the wellbore into the subterranean formation. The material may be injected into the lost circulation zone or squeezed into the lost circulation zone. During subsequent drilling of the wellbore and hydrocarbon production using the well, conventional lost circulation materials, such as conventional cements, used to isolate lost circulation zones often result in high fluid loss to the formation because of a long cure time. Additionally, in circumstances in which the commercially available cement compositions cure in the drill pipe or coiled tubing used to dispense the cement into the lost circulation zone, the cured cements, which are not acid soluble, cannot be easily removed from the piping, such as through milling or cutting out the plugged section of the piping and replacing the piping. Fixing cement cured in the piping may cause delays in drilling.

As previously discussed, the present disclosure is directed to accelerated cement compositions having an accelerated curing time and acid solubility and methods of treating lost circulation zones using the accelerated cement compositions. The methods of the present disclosure for treating a lost circulation zone in a wellbore may include contacting an accelerant composition comprising triethanolamine with a cement composition in the lost circulation zone. The cement composition may include at least from 1 weight percent (wt. %) to 90 wt. % cement precursor based on the total weight of the cement composition and from 5 wt. % to 70 wt. % water based on the total weight of the cement composition. A weight ratio of triethanolamine to the cement precursor may be from 0.1 percent (%) to 60% based on the total weight of the cement precursor (BWOC). The method of the present disclosure for treating a lost circulation zone in a wellbore may further include curing the cement composition in the lost circulation zone to form a cured cement, where the triethanolamine accelerates the curing rate of the cement composition and the cured cement seals the lost circulation zone.

The method for treating a lost circulation zone in a wellbore, may include contacting an accelerant composition with a cement composition to form an accelerated cement composition and curing the accelerated cement composition in the lost circulation zone to form a cured cement. The accelerant composition may include triethanolamine. The triethanolamine may accelerate the curing rate of the accelerated cement composition compared to commercially available cements. The accelerated cure time may enable the accelerated cement composition to cure in a short enough time to reduce or prevent further loss of the accelerated cement composition to the lost circulation zone. The resulting cured cement may seal the lost circulation zone to prevent further fluid loss to the subterranean formation. The accelerant composition may include any other constituent, property, or characteristic subsequently described in this disclosure for the accelerant composition. The cement composition may include at least from 1 weight percent (wt. %) to 90 wt. % cement precursor based on the total weight of the cement composition and from 5 wt. % to 70 wt. % water based on the total weight of the cement composition. A weight ratio of triethanolamine to the cement precursor in the accelerated cement composition may be from 0.1 percent (%) to 60% by weight of cement (based on the total weight of the cement precursor). The cement composition may include any other constituent, property, or characteristic subsequently described in this disclosure for the cement composition. After curing, the lost circulation zone may be isolated from the other portions of the wellbore by the cured cement composition.

In embodiments, contacting the accelerant composition with the cement composition in the lost circulation zone may include injecting the accelerant composition into the lost circulation zone, and injecting the cement composition into the lost circulation zone after injecting the accelerant composition. In embodiments, the accelerant composition, the cement composition, or both, may be injected through the drill bit of the drill string, through a tubular string, or any other pipe string without a drill device. The accelerant composition, the cement composition, or both, may also be injected through other methods or techniques, such as but not limited to squeezing, injection through tubing, injection through the casing, or injection through the annulus. The cement composition and accelerant composition may contact and mix in the lost circulation zone to produce the accelerated cement composition having an increased cure rate compared to the cement composition by itself.

Prior to contacting the accelerant composition with the cement composition in the lost circulation zone, the method may include drilling the wellbore, placing the tubular string in the wellbore, or both. Injecting the cement composition, accelerant composition, or both, into the annulus may include pumping the cement composition and the accelerant composition into the fluid conduit defined by an interior surface of the tubular string and pumping a displacement fluid into the fluid conduit after the cement composition such that the displacement fluid displaces the cement composition from the fluid conduit into the lost circulation zone. In embodiments, the cement composition, accelerant composition, or both, may include one or more constituents that may be at least partially incompatible with drilling fluids or other treatment fluids present in the wellbore prior. When the cement composition, accelerant composition, or both, includes constituents incompatible with drilling or treatment fluids already present in the wellbore, the method may further include injecting a spacer fluid into the fluid conduit, the wellbore, or both, before injecting the cement composition, accelerant composition, or both, into the wellbore. The spacer fluid may provide a buffer between the drilling fluid or treatment fluid and the cement composition, accelerant composition, or both, to prevent contact between incompatible constituents.

In embodiments, contacting the accelerant composition with the cement composition in the lost circulation zone may include preparing the cement composition, combining the accelerant composition with the cement composition to produce an accelerated cement composition, and injecting the accelerated cement composition into the lost circulation zone. In embodiments, contacting the accelerant composition with the cement composition in the lost circulation zone may include injecting the accelerant composition into the lost circulation zone and injecting the cement composition into the lost circulation zone after injecting the accelerant composition. The cement composition may mix with the accelerant composition following injection of the cement composition into the lost circulation zone. In embodiments, the cement composition may be injected into the lost circulation followed by injection of the accelerant composition.

In embodiments, after contacting the accelerant composition with the cement composition in the lost circulation zone and allowing the accelerated cement composition to cure, the method may further include continuing drilling the wellbore, placing the tubular string in the wellbore, or both. Injecting the accelerated cement composition into the lost circulation zone may include pumping the accelerated cement composition into the wellbore defined by an interior surface of the tubular string and pumping a displacement fluid into the wellbore after the accelerated cement composition such that the displacement fluid displaces the accelerated cement composition from the fluid conduit into the lost circulation zone. In embodiments, the accelerated cement composition may include one or more constituents that may be at least partially incompatible with drilling fluids or other treatment fluids present in the wellbore when the lost circulation zone is encountered. When the accelerated cement composition includes constituents incompatible with drilling or treatment fluids already present in the wellbore, the method may further include injecting a spacer fluid into the fluid conduit, the wellbore, or both, before injecting the accelerated cement composition into the wellbore. The spacer fluid may provide a buffer between the drilling fluid or treatment fluid and the accelerated cement composition to prevent contact between incompatible constituents.

As previously discussed, the accelerated cement composition includes a cement composition comprising at least a cement precursor and water. The cement composition may further include one or more of silica sand, silica flour, weighting agents, cement retarders, defoamers, or combinations of these. The cement composition may also include one or more additives, such as but not limited to, one or more of expansion additives, friction reducers, gas block stabilizers, dispersants, surfactants, latex, latex stabilizers, epoxy resins, epoxy curing agents, or combinations of these. Other constituents typically added to wellbore cements may also be incorporated into the cement compositions.

The cement precursor may be any suitable material which, when mixed with water, can be cured into a cement. The cement precursor may include hydraulic or non-hydraulic cement precursors. A hydraulic cement precursor may include a mixture of limestone, clay and gypsum burned together at temperatures greater than 1000 degrees Celsius (° C.). Cement compositions prepared with hydraulic cement precursors may harden instantly or within a few minutes when contacted with water. A non-hydraulic cement precursor may include mixtures of lime, gypsum, plasters, and oxychloride. Cement compositions prepared with non-hydraulic cement precursors may take longer to harden or may require drying conditions for proper strengthening, but may be more economically feasible. The cement precursor may include one or more classes of cement precursors identified by the American Petroleum Institute (API), such as an API Class G cement. The cement precursor may be a Portland cement precursor, such as but not limited to a Class G Portland cement. Portland cement is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter-ground addition. The cement precursor may also include a Saudi Class G cement precursor, which may include a mixture of Portland cement and crystalline silica, which may be referred in the alternative as quartz.

The cement precursor may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), hexavalent chromium, trivalent chromium, calcium aluminate, or combinations of these. The cement precursor material may include Portland cement, siliceous fly ash, calcareous fly ash, slag cement, silica fume, quartz, other cement precursor material, or any combination of these.

The cement composition may include Saudi Class G cement. Saudi Class G cement may include from 60 wt. % to 100 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 70 wt. % to 100 wt. %, from 70 wt. % to 99 wt. %, from 70 wt. % to 97 wt. %, from 70 wt. % to 95 wt. %, from 70 wt. % to 90 wt. %, from 70 wt. % to 80 wt. %, from 80 wt. % to 100 wt. %, from 80 wt. % to 99 wt. %, from 80 wt. % to 97 wt. %, from 80 wt. % to 95 wt. %, from 80 wt. % to 90 wt. %, from 90 wt. % to 100 wt. %, from 90 wt. % to 99 wt. %, from 90 wt. % to 97 wt. %, from 90 wt. % to 95 wt. %, from 95 wt. % to 100 wt. %, or from 95 wt. % to 99 wt. % Portland cement based on the total weight of the Saudi Class G cement precursor. Saudi Class G cement precursor may include less than 40 wt. %, less than 30 wt. %, less than 20 wt. %, less than 10 wt. %, less than 5 wt. %, less than 3 wt. %, or even less than 1 wt. % crystalline silica, or quartz based on the total weight of the Saudi Class G cement precursor. Saudi Class G cement precursor may include greater than 0.1 wt. %, greater than 1 wt. %, greater than 3 wt. %, or even greater than or equal to 5 wt. % crystalline silica or quartz based on the total weight of the Saudi Class G cement precursor. Saudi Class G cement precursor may have a pH greater than 7, such as from 8 to 14, from 10 to 13, from 11 to 13, from 12 to 13, or 12.4. Saudi Class G cement may have a bulk density at 20° C. of from 70 pounds per cubic foot (lb/ft$^3$) (1121 kilograms per cubic meter (kg/m$^3$), where 1 lb/ft$^3$ equals 16.0185 kg/m$^3$) to 120 lb/ft$^3$ (1922 kg/m$^3$), from 80 lb/ft$^3$ (1281 kg/m$^3$) to 110 lb/ft$^3$ (1762 kg/m$^3$), or from 90 lb/ft$^3$ (1442 kg/m$^3$) to 100 lb/ft$^3$ (1602 kg/m$^3$), or 94 lb/ft$^3$ (1506 kg/m$^3$). Saudi Class G cement precursor may have a solubility in water of from 0.1 grams per 100 milliliters (g/100 ml) to 2 g/100 ml, from 0.1 g/100 ml to 1 g/100 ml, from 0.1 g/100 ml to 0.8 g/100 ml, from 0.1 g/100 ml to 0.5 g/100 ml, from 0.2 g/100 ml to 2 g/100 ml, from 0.2 g/100 ml to 1 g/100 ml, from 0.2 g/100 ml to 0.8 g/100 ml, from 0.2 g/100 ml to 0.5 g/100 ml, from 0.5 g/100 ml to 2 g/100 ml, from 0.5 g/100 ml to 1 g/100 ml, from 0.5 g/ml to 0.8 g/100 ml, or 0.5 g/100 ml.

The cement composition, the accelerated cement composition, or both, may include an amount of cement precursor sufficient to produce a hard rigid cement upon curing. The cement composition, the accelerated cement composition, or both, may include greater than or equal to 1 wt. %, greater than or equal to 2 wt. %, greater than or equal to 5 wt. %, greater than or equal to 10 wt. %, greater than or equal to 20 wt. %, greater than or equal to 30 wt. %, or greater than or equal to 50 wt. % cement precursor based on the total weight of the cement composition or the total weight of the accelerated cement composition, respectively. The cement composition, the accelerated cement composition, or both, may include less than or equal to 90 wt. %, less than or equal to 80 wt. %, less than or equal to 70 wt. %, or even less than or equal to 60 wt. % cement precursor based on the total weight of the cement composition or the total weight of the accelerated cement composition, respectively. The cement composition, the accelerated cement composition, or both, may include from 1 wt. % to 90 wt. %, from 1 wt. % to 80 wt. %, from 1 wt. % to 70 wt. %, from 1 wt. % to 60 wt. %, from 1 wt. % to 50 wt. %, from 2 wt. % to 90 wt. %, from 2 wt. % to 80 wt. %, from 2 wt. % to 70 wt. %, from 2 wt. % to 60 wt. %, from 2 wt. % to 50 wt. %, from 5 wt. % to 90 wt. %, from 5 wt. % to 80 wt. %, from 5 wt. % to 70 wt. %, from 5 wt. % to 60 wt. %, from 5 wt. % to 50 wt. %, from 10 wt. % to 90 wt. %, from 10 wt. % to 80 wt. %, from 10 wt. % to 70 wt. %, from 10 wt. % to 60 wt. %, from 10 wt. % to 50 wt. %, from 20 wt. % to 90 wt. %, from 20 wt. % to 80 wt. %, from 20 wt. % to 70 wt. %, from 20 wt. % to 60 wt. %, from 20 wt. % to 50 wt. %, from 30 wt. % to 90 wt. %, from 30 wt. % to 80 wt. %, from 30 wt. % to 70 wt. %, from 30 wt. % to 60 wt. %, from 30 wt. % to 50 wt. %, from 50 wt. % to 90 wt. %, from 50 wt. % to 80 wt. %, from 50 wt. % to 70 wt. %, or from 50 wt. % to 60 wt. % cement precursor based on the total weight of the cement composition or the accelerated cement composition, respectively. In embodiments, the cement composition, the accelerated cement composition, or both, may include from 80 wt. % to 90 wt. % cement precursor based on the total weight of the cement composition or the accelerated cement composition, respectively.

Water may be added to the cement precursor and other constituents to produce the cement composition. The water in the cement composition may include distilled water, deionized water, filtered water, or tap water. The water used to produce the cement composition may be in the form of an aqueous solution containing additives or contaminants. The water may include freshwater or seawater, natural or synthetic brine, salt water, municipal water, well water, formation water, produced water, brackish water, or combinations of these. Salts or other organic compounds may be incorporated into the water to control certain properties of the water, and thus control properties of the cement composition, such as density. Suitable salts may include, but are not limited to, alkali metal chlorides, hydroxides, or carboxylates. In embodiments, salts present in the water may include, but are not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these. The water may be substantially free of salts, such as having less than 1 wt. % based on the total weight of the water. The water may have less than 0.1 wt. % or even less than 0.01 wt. % salts based on the total weight of the water.

The cement composition, the accelerated cement composition, or both, may include an amount of water sufficient to allow the cement composition to be pumpable and to cause curing of the cement composition. The cement composition, the accelerated cement composition, or both, may have greater than or equal 5 wt. %, greater than or equal to 10 wt. %, or greater than or equal 15 wt. % water based on the total weight of the cement composition. The cement composition, the accelerated cement composition, or both, may include less than or equal to 70 wt. %, less than or equal to 60 wt. %, less than or equal to 50 wt. %, or even less than or equal to 40 wt. % water based on the total weight of the cement composition. The cement composition, the accelerated cement composition, or both, may include from 5 wt. % to 70 wt. %, from 5 wt. % to 60 wt. %, from 5 wt. % to 50 wt. %, from 5 wt. % to 40 wt. %, from 5 wt. % to 20 wt. %, from 10 wt. % to 70 wt. %, from 10 wt. % to 60 wt. %, from 10 wt. % to 50 wt. %, from 10 wt. % to 40 wt. %, from 15 wt. % to 70 wt. %, from 15 wt. % to 60 wt. %, from 15 wt. % to 50 wt. %, or from 15 wt. % to 40 wt. % water based on the total weight of the cement composition.

As previously discussed, the cement composition may include silica sand, silica flour, weighting agents, surfactants, cement retarders, defoamers, or combinations of these. Silica sand, silica flour, or both, may be included in the cement composition as strength stabilizing agents. Silica sand, silica flour, or both, may be used to stabilize the strength and permeability of the cement composition at downhole temperatures between 230° F. and 700° F. (110° C. and 371° C.), prevent strength retrogression, and decrease the permeability of the cured cement. Silica sand may include any naturally-occurring or man-made silica sand. The silica sand may have an average particle size of from 100 micrometers (μm) (microns) to 200 μm, from 100 μm to 180 μm, from 100 μm to 175 μm, from 150 μm to 200 μm, from 150 μm to 180 μm, from 150 μm to 175 μm, from 175 μm to 200 μm, or from 180 μm to 200 μm. The cement composition, the accelerated cement composition, or both, may include from 0% BWOC to 50% BWOC silica sand, from 0% BWOC to 20% BWOC, from 0% BWOC to 10%, BWOC, from 1% BWOC to 50% BWOC, from 1% BWOC to 20% BWOC, from 1% BWOC to 10% BWOC, from 10% BWOC to 50% BWOC, or from 10% to 20% BWOC silica sand. In embodiments, the cement composition, the accelerated cement composition, or both, may not include silica sand or may be substantially free of silica sand. The cement composition, the accelerated cement composition, or both, may have less than 1% BWOC, less than 0.1% BWOC or even less than 0.01% BWOC silica sand.

The silica flour may be any naturally-occurring or man-made silica flour. The silica flour may have an average particle size less than the silica sand. The silica flour may have an average particle size less than 100 μm, less than or equal to 75 μm, less than or equal to 50 μm, less than or equal to 25 μm, less than or equal to 15 μm, or even less than or equal to 10 μm. The silica flour may have an average particle size of from 1 μm to 100 μm, from 1 μm to 75 μm, from 1 μm to 50 μm, from 1 μm to 25 μm, from 1 μm to 15 μm, from 5 μm to 100 μm, from 5 μm to 75 μm, from 5 μm to 50 μm, from 5 μm to 25 μm, or from 5 μm to 15 μm. The cement composition, the accelerated cement composition, or both, may include from greater than 0% BWOC to 50% BWOC, from greater than 0% BWOC to 40% BWOC, from greater than 0% BWOC to 30% BWOC, from greater than 0% BWOC to 20% BWOC, from 1% BWOC to 50% BWOC, from 1% BWOC to 40% BWOC, from 1% BWOC to 30% BWOC, from 1% BWOC to 20% BWOC, from 5% BWOC to 50% BWOC, from 5% BWOC to 40% BWOC, from 5% BWOC to 30% BWOC, from 5% BWOC to 20% BWOC silica flour. In embodiments, the cement composition, the accelerated cement composition, or both, may not include silica flour or may be substantially free of silica flour. The cement composition, the accelerated cement composition, or both may have less than 1% BWOC silica flour, less than 0.1% BWOC, or even less than 0.01% BWOC silica flour. The silica flour may be used in combination with silica sand to formulate the cement composition with a density of from 130 lb/ft$^3$ (2082 kg/m$^3$) to 165 lb/ft$^3$ (2643 kg/m$^3$), which may provide for resistance of gas migration problems through the cured cement. The combination of the silica sand and silica flour may increase the solids packing density of the cement composition, the accelerated cement composition, or both, and thus reduce the permeability of the cured cement to gas flow, among other features.

As previously discussed, the cement composition may include a weighting agent, which may also be referred to as a "weighting material" or "weight material." The weighting agent may include particulate solids having a specific gravity (SG) that may operate to increase the density of the cement slurry. Examples of weighting agents may include, but are not limited to, sand, barite (barium sulfate), hematite, calcium carbonate, siderite, ilmenite, silica sand, manganese oxide (MnO), hausmanite (manganese tetroxide ($Mn_3O_4$)), zinc oxide, zirconium oxide, iron oxide, fly ash, or any combination of these weighting agents. The cement composition may include one weighting agent or a combination of two or more different weighting agents, each with different properties. The weighting agents can be obtained from any readily available source. The weighting agent may have a specific gravity (SG) of from 2 to 6, from 2 to 5, from 3 to 6, or from 3 to 5. The weighting agents may have a mean particle size distribution of from 0.1 μm to 50 μm, or from 0.1 μm to 40 μm, from 0.1 μm to 30 μm, from 0.1 μm to 20 μm, from 0.1 μm to 10 μm, from 10 μm to 50 μm, from 10 μm to 40 μm, from 10 μm to 30 μm, from 10 μm to 20 μm, from 20 μm to 50 μm, from 20 μm to 40 μm, from 20 μm to 30 μm, from 30 μm to 50 μm, from 30 μm to 40 μm, or from 40 μm to 50 μm. The cement composition, the accelerated cement composition, or both, may include from 10% BWOC to 150% BWOC, from 10% BWOC to 125% BWOC, from 10% BWOC to 100%, from 10% BWOC to 75% BWOC, from 10% BWOC to 50% BWOC, from 20% BWOC to 150% BWOC, from 20% BWOC to 125% BWOC, from 20% BWOC to 100% BWOC, from 20% BWOC to 75% BWOC, from 20% BWOC to 50% BWOC, from 50% BWOC to 150% BWOC, from 50% BWOC to 125% BWOC, from 50% BWOC to 100% BWOC, from 50% BWOC to 75% BWOC, from 75% BWOC to 150% BWOC, or from 100% BWOC to 150% BWOC weighting agent. In embodiments, the cement composition, the accelerated cement composition, or both, may not include a weighting agent or may be substantially free of weighting agents. The cement composition, the accelerated cement composition, or both, may have less than 1% BWOC, less than 0.1% BWOC, or even less than 0.01% BWOC weighting agents.

The addition or one or more of these components (the silica sand, silica flour, and weighting agent) to the cement composition may reduce settling in the cement composition. In some embodiments, the inclusion of one or more of the silica sand, silica flour, weighting agent, or combinations of these may reduce the porosity of the cement composition by including different particles size distributions of particles and components.

The cement composition, the accelerated cement composition, or both, may include from 0.1% BWOC to 10% BWOC surfactant. In embodiments, the cement composition, the accelerated cement composition, or both may not include a surfactant. The cement composition, the accelerated cement composition, or both, may include a cement retarder to adjust or slow down the curing rate of the accelerated cement composition. Examples of retarders may include lignin, gums, starches, lignosulphonate derivatives, or combinations of these. In embodiments, the accelerated cement composition may not include a cement retarder. The cement composition may include one or a plurality of defoamers. The defoamers, or "anti-foam additives," may be added to the cement composition to prevent frothing, foaming, and vapor entrapment that may occur during the mixing process of a cement slurry. The cement composition, the accelerated cement composition, or both, may include less than 5 gps defoamer, where gps refers to U.S. gallons per sack of cement precursor. The cement composition, the accelerated cement composition, or both, may include less than or equal to 1 gps defoamer, or even less than or equal to 0.5 gps defoamer. In embodiments, the cement composition, accelerated cement composition, or both, may not include a defoamer or may be substantially free of defoamers. The cement composition, accelerated cement composition, or both, may have less than or equal to 1% BWOC, less 0.1% BWOC, or even less than 0.01% BWOC defoamer.

The cement composition may include additives, such as but not limited to, expansion additives, dispersants, fluid loss additives, friction reducers, gas block stabilizers, other additives, or combinations of these. The cement composition may include an expansion additive. The expansion additive can be selected from known expansion additive compounds. Examples of expansion additives may include metal oxides, examples of which include, but are not limited to, calcium oxide (CaO), magnesium oxide (MgO), metal oxides of zinc, magnesium, iron, aluminum powders, or combinations of these. In embodiments, the expansion additive may be a calcined magnesium oxide. In embodiments, the expansion additive may be a mixture of calcium oxide and magnesium oxide. The cement composition, accelerated cement composition, or both, may include less than or equal to 10% BWOC expansion additive or less than or equal to 5% BWOC expansion additive. The cement composition, accelerated cement composition, or both, may include from 0.0% BWOC to 10% BWOC, from 0.0% BWOC to 5% BWOC, from 0.1% BWOC to 10% BWOC, from 0.1% BWOC to 5% BWOC, or from 1% BWOC to 10% BWOC expansion additive.

In embodiments, the cement composition, accelerated cement composition, or both, may not include an expansion additive or may be substantially free of expansion additives. The cement composition, accelerated cement composition, or both, may have less than less than 0.1% BWOC, or even less than 0.01% BWOC expansion additive.

During curing, hydration of magnesium oxide to magnesium hydroxide may provide an expansive force within the cement matrix. Diameters of tubular strings, such casings and liners, may be affected by changes in temperature and pressure, and therefore, the diameters of such tubular strings may be reduced or expanded, which can lead to the formation of a microannulus. The expansion additive may be used in the cement composition to maintain a seal around the tubular string and against the wellbore wall of the wellbore to achieve superior bonding.

The cement compositions may include a dispersant containing one or more anionic groups. The dispersant may include synthetic sulfonated polymers, lignosulfonates with carboxylate groups, hydroxylated sugars, other anionic groups, or combinations of any of these. The cement composition, accelerated cement composition, or both, may include from 0.0% BWOC to 10% BWOC dispersant. In embodiments, the cement composition, accelerated cement composition, or both, may not include a dispersant or may be substantially free of dispersants, such as having less than 1% BWOC, less than 0.1% BWOC, or even less than 0.01% BWOC dispersant.

The cement compositions may include a fluid loss additive. The fluid loss additive may include non-ionic cellulose derivatives, such as, but not limited to, hydroxyethylcellulose (HEC). Alternatively or additionally, the fluid loss additive may be a non-ionic synthetic polymer, such as but not limited to, polyvinyl alcohol or polyethyleneimine. The fluid loss additive may also include one or more anionic synthetic polymers, such as, but not limited to, 2-acrylamido-2-methylpropane sulfonic acid (AMPS) or AMPS-copolymers, including lattices of AMPS-copolymers. The fluid loss additive may include bentonite. The fluid loss additive may include an acrylamide copolymer, an aliphatic amide polymer, an acrylic polymer, bentonite, latex polymers, gilsonite, additives to latex (for example, styrene-butadiene latex in combination with nonionic and anionic surfactants), octylphenol ethoxylate, polyethylene oxide, copolymers of maleic anhydride, 2-hydroxypropyl acrylate, or combinations of these. The cement composition, accelerated cement composition, or both, may include less than or equal to 5% BWOC, less than or equal to 1% BWOC, or even less than or equal to 0.5% BWOC fluid loss additive. The cement composition, accelerated cement composition, or both, may include from 0.001% BWOC to 5% BWOC, from 0.001% BWOC to 1% BWOC, from 0.001% BWOC to 0.5% BWOC, or from 0.001% BWOC to 0.01% BWOC fluid loss additive. In embodiments, the cement composition, the accelerated cement composition, or both, may not include a fluid loss additive.

The cement composition may include a friction reducer. The friction reducer may be a sulfonic acid salt or an aromatic polymer derivative. Other cement friction reducers may include, but are not limited to, polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous lignosulfonate, ferrous sulfate, tannic acid, alkali lignosulfonate, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate, casein polysaccharides, or combinations of these. The cement composition, accelerated cement composition, or both, may include less than or equal to 10% BWOC friction reducer, such as less than or equal to 5% BWOC, less than or equal to 1% BWOC, or even less than or equal to 0.5% BWOC friction reducer. The cement composition, accelerated cement composition, or both, may include from 0.0% BWOC to 10% BWOC, from 0.0% BWOC to 5% BWOC, from 0.0% BWOC to 1% BWOC, from 0.0% BWOC to 0.5% BWOC, from 0.001% BWOC to 10% BWOC, from 0.001% BWOC to 5% BWOC, from 0.001% BWOC to 1% BWOC, or from 0.001% BWOC to 0.5% BWOC friction reducer. In embodiments, the cement composition, the accelerated cement composition, or both, may not include a friction reducer.

The cement composition may include a gas block stabilizer. Gas block stabilizers may include, but are not limited to, an aminated aromatic salt, an alkyl ether sulfate, an aminated aromatic polymer, or combinations of these. The cement composition, accelerated cement composition, or both, may comprise less than 10 gallons per sack of cement (gps), less than or equal to 5 gps, or even less than or equal to 1 gps gas block stabilizer. The cement composition, accelerated cement composition, or both, may include from 0.0 gps to 10 gps, from 0.0 gps to 5 gps, from 0.0 gps to 1 gps, from 0.1 gps to 10 gps, from 0.1 gps to 5 gps, from 0.1 gps to 1 gps, from 1 gps to 10 gps, or from 1 gps to 5 gps of gas block stabilizer. In embodiments, the cement composition, the accelerated cement composition, or both, may not include a gas block stabilizer.

As previously discussed, the accelerant composition may be included in the accelerated cement composition. The accelerant composition may increase or accelerate the curing rate of the accelerated cement composition, which may reduce the cure time of the accelerated cement composition. The presence of the accelerant composition may enable the accelerated cement composition to have a sufficiently short cure time, such as a cure time of less than 8 hours, less than or equal to 6 hours, less than or equal to 4 hours, less than or equal to 3 hours, or even less than or equal to 2 hours to treat a high-injectivity lost circulation zone without being lost to the formation. The controllable cure time of the accelerated cement compositions of the present disclosure may reduce the downtime of drilling operations resulting from lost circulation zones.

As previously discussed, the accelerant composition may include an accelerator compound. Examples of accelerator compounds may include triethanolamine (TEA), aluminum sulphate, or combinations of these. In embodiments, the accelerant composition may include triethanolamine. Being an amine, the triethanolamine can interact with metal ions, such as iron III ions ($Fe^{3+}$), aluminum ions ($Al^{3+}$), calcium ions ($CA^{2+}$), or combinations of these, in the hydrated cement composition to chelate the metal ions. Chelation of the iron ions, aluminum ions, or both by the triethanolamine may accelerate C3A hydration of the cement composition. The triethanolamine may also chelate the calcium ions, which may change the morphology of the portlandite in the Portland cement. The chelation of metal ions by triethanolamine may be based on complexation reactions in which the triethanolamine acts as an electron pair donor. Through chelation of metal ions in the accelerated cement composition, the triethanolamine may increase the curing rate of the accelerated cement composition.

The inclusion of triethanolamine in the accelerated cement compositions may further increase the acid solubility of the accelerated cement compositions. Increasing the acid solubility of the accelerated cement composition may enable removal of the accelerated cement composition that has thickened or cured in the piping or equipment used to inject the accelerated cement composition. Increased acid solubility of the accelerated cement composition may enable the set cement to be removed from piping by using hydrochloric acid or other acid to dissolve the accelerated cement composition and wash out the piping.

The triethanolamine may further provide additional anti-corrosive properties. The triethanolamine of the accelerant composition may react with the metal at the surface of tubular strings or other metal components of the wellbore to form a protective layer on the surface of the metal. The protective layer formed by reaction of the triethanolamine with the metal surface may reduce or prevent dissolution of iron or other metals from the surface of the tubular string or other metal component to reduce corrosion. Thus, incorporating triethanolamine into the accelerant composition may both increase the curing rate of the accelerated cement composition and reduce corrosion rates of metal components of the wellbore.

The accelerant composition may include from 5 wt. % to 100 wt. % triethanolamine based on the total weight of the accelerant composition. In embodiments, the accelerant composition may include from 5 wt. % to 90 wt. %, from 5 wt. % to 70 wt. %, from 5 wt. % to 50 wt. %. from 5 wt. % to 30 wt. %, from 10 wt. % to 100 wt. %, from 10 wt. % to 90 wt. %, from 10 wt. % to 70 wt. %, from 10 wt. % to 50 wt. %, from 10 wt. % to 30 wt. %, from 30 wt. % to 100 wt. %, from 30 wt. % to 90 wt. %, from 30 wt. % to 70 wt. %, from 30 wt. % to 50 wt. %, from 50 wt. % to 100 wt. %, from 50 wt. % to 90 wt. %, from 50 wt. % to 70 wt. %, from 70 wt. % to 100 wt. %, from 70 wt. % to 90 wt. %, or from 90 wt. % to 100 wt. % triethanolamine based on the total weight of the accelerant composition.

The accelerated cement composition may have an amount of the accelerant composition sufficient to provide an amount of triethanolamine in the accelerated cement composition of from 0.1% BWOC to 90% BWOC. The amount of triethanolamine in the accelerated cement composition may be from 0.1% BWOC to 85% BWOC, from 0.1% BWOC to 80% BWOC, from 0.1% BWOC to 75% BWOC, from 1% BWOC to 70% BWOC, from 0.1% BWOC to 65% BWOC, from 0.1% BWOC to 60% BWOC, from 0.1% BWOC to 55% BWOC, from 0.1% BWOC to 50% BWOC, from 1% BWOC to 90% BWOC, from 1% BWOC to 85% BWOC, from 1% BWOC to 80% BWOC, from 1% BWOC to 75% BWOC, from 1% BWOC to 70% BWOC, from 1% BWOC to 65% BWOC, from 1% BWOC to 60% BWOC, from 1% BWOC to 55% BWOC, from 1% BWOC to 50% BWOC, from 2% BWOC to 90% BWOC, from 2% BWOC to 85% BWOC, from 2% BWOC to 80% BWOC, from 2% BWOC to 75% BWOC, from 2% BWOC to 70% BWOC, from 2% BWOC to 65% BWOC, from 2% BWOC to 60% BWOC, from 2% BWOC to 55% BWOC, from 2% BWOC to 50% BWOC, from 3% BWOC to 90% BWOC, from 3% BWOC to 80% BWOC, from 3% BWOC to 75% BWOC, from 3% BWOC to 70% BWOC, from 3% BWOC to 65% BWOC, from 3% BWOC to 60% BWOC, from 3% BWOC to 55% BWOC, from 3% BWOC to 50% BWOC, from 0.1% BWOC to 20% BWOC, from 0.1% BWOC to 10% BWOC, or from 0.1% BWOC to 5% BWOC. The accelerated cement composition may include an amount of the accelerant composition sufficient so that the accelerated cement composition has a concentration of triethanolamine greater than or equal to 10,000 parts per million by weight (ppmw), such as greater than or equal to 15,000 ppmw, or even greater than or equal to 20,000 ppmw based on the total weight of the accelerated cement composition. When the concentration of triethanolamine in the accelerated cement composition is less than about 10,000 ppmw, the triethanolamine may have a retarding effect on the curing rate of the accelerated cement composition.

The accelerant composition may include aluminum sulphate in combination with the triethanolamine. Aluminum sulphate may be included in the accelerant composition to provide an additional increase in curing rate of the accelerated cement composition to reduce the cure time of the accelerated cement composition. Additionally, the aluminum sulphate may increase the drying shrinkage and improve early strength development in the accelerated cement composition. However, aluminum sulphate may reduce fluidity of the accelerated cement composition and may weaken the late strength of the cured cement. The aluminum sulphate may not provide anti-corrosive properties as are provided by the triethanolamine. When the accelerant composition includes aluminum sulphate, the accelerant composition may include from 10 wt. % to 30 wt. %, from 15 wt. % to 30 wt. %, from 20 wt. % to 30 wt. %, from 10 wt. % to 25 wt. %, from 15 wt. % to 25 wt. %, or from 10 wt. % to 20 wt. % aluminum sulphate based on the total weight of the accelerant composition.

In embodiments, the accelerant composition may include from 5 wt. % to 10 wt. % triethanolamine based on the total weight of the accelerant composition and from 10 wt. % to 30 wt. % aluminum sulphate based on the total weight of the accelerant composition. In embodiments, the accelerant composition may not include aluminum sulphate or may be substantially free of aluminum sulphate. The accelerant composition may have less than 0.1 wt. % aluminum sulphate based on the total weight of the accelerant composition.

The accelerant composition may include calcium chloride in addition to the triethanolamine. Calcium chloride may further increase the curing rate of the accelerated cement composition. However, the presence of calcium chloride may have an adverse effect on the corrosive properties of the accelerated cement composition. When calcium chloride is present, the accelerant composition may include from 0.1 wt. % to 90 wt. %, from 0.1 wt. % to 85 wt. %, from 0.1 wt. % to 80 wt. %, from 0.1 wt. % to 75 wt. %, from 0.1 wt. % to 70 wt. %, from 0.1 wt. % to 65 wt. %, from 0.1 wt. % to 60 wt. %, from 0.1 wt. % to 55 wt. %, from 0.1 wt. % to 50 wt. %, from 1 wt. % to 90 wt. %, from 1 wt. % to 85 wt. %, from 1 wt. % to 80 wt. %, from 1 wt. % to 75 wt. %, from 1 wt. % to 70 wt. %, from 1 wt. % to 65 wt. %, from 1 wt. % to 60 wt. %, from 1 wt. % to 55 wt. %, from 1 wt. % to 50 wt. %, from 2 wt. % to 90 wt. %, from 2 wt. % to 85 wt. %, from 2 wt. % to 80 wt. %, from 2 wt. % to 75 wt. %, from 2 wt. % to 70 wt. %, from 2 wt. % to 65 wt. %, from 2 wt. % to 60 wt. %, from 2 wt. % to 55 wt. %, from 2 wt. % to 50 wt. %, from 5 wt. % to 90 wt. %, from 3 wt. % to 85 wt. %, from 5 wt. % to 80 wt. %, from 5 wt. % to 75 wt. %, from 5 wt. % to 70 wt. %, from 5 wt. % to 65 wt. %, from 5 wt. % to 60 wt. %, from 5 wt. % to 55 wt. %, or from 5 wt. % to 50 wt. %. In embodiments, when calcium chloride is present, the accelerant composition may include 5 wt. % to 10 wt. %, from 5 wt. % to 9 wt. %, from 5 wt. % to 8 wt. %, from 6 wt. % to 10 wt. %, from 6 wt. % to 9 wt. %, or from 6 wt. % to 8 wt. % calcium chloride based on the total weight of the accelerant composition. In embodiments, the accelerant composition does not include calcium chloride or may be substantially free of calcium chloride. The accelerant composition may have less than 0.1 wt. %, or even less than 0.01 wt. % calcium chloride based on the total weight of the accelerant composition. In embodiments, the accelerated cement composition does not include calcium chloride or may be substantially free of calcium chloride, such as having less than 0.1 wt. %, less than 0.01 wt. %, or even less than 0.001 wt. % calcium chloride based on the total weight of the accelerated cement composition.

In embodiments, the accelerant composition may consist of or consist essentially of triethanolamine and water. The water in the accelerant composition may include distilled water, deionized water, filtered water, or tap water. The water may include freshwater or seawater, natural or synthetic brine, salt water, municipal water, well water, formation water, produced water, brackish water, or combinations of these.

As previously discussed, the cement composition may be included in the accelerated cement composition. The cement composition may include from 1 wt. % to 90 wt. % cement precursor based on the total weight of the cement composition and from 5 wt. % to 70 wt. % water based on the total weight of the cement composition. In embodiments, the cement precursor may be an API Class G cement. In embodiments, the cement precursor may include metal oxide. The metal oxide may include aluminum oxide, iron oxide, calcium oxide, magnesium oxide, or combination thereof. The cement composition may include from 10 wt. % to 150 wt. % weighting agent based on the total weight of the cement composition. The weighting agent may include hematite, hausmanite, or both. The cement composition may have a density in a range of from 65 pcf to 180 pcf.

As previously discussed, the accelerant composition may be included in the accelerated cement composition. The accelerant composition may include triethanolamine. In embodiments, a weight ratio of triethanolamine to the cement precursor may be from 0.1% to 90% BWOC. In embodiments, the accelerant composition may further include an aluminum sulphate. In embodiments, the accelerant composition may include from 5 wt. % to 10 wt. % triethanolamine based on the total weight of the accelerant composition and from 10 wt. % to 30 wt. % aluminum sulphate based on the total weight of the accelerant composition. In embodiments, the accelerant composition may not include aluminum sulphate or may be substantially free of aluminum sulphate. In embodiments, the accelerant composition may consist of or consist essentially of triethanolamine and water.

The accelerated cement composition may be produced by preparing the cement composition, preparing the accelerant composition, and then adding or contacting the accelerant composition with the cement composition. The cement composition may be prepared separately from the accelerant composition and the accelerant composition may be added to the cement composition to produce the cement composition just before use of the cement composition. For example, in embodiments, the cement composition may be prepared in a first vessel and the accelerant composition may be prepared in a second vessel separate from the first vessel. The accelerant composition may be added to the cement composition to produce the accelerated cement composition and the accelerated cement composition may be mixed for a period of time sufficient to produce a homogeneous mixture. In some embodiments, the accelerated cement composition may be mixed for a period of from 10 minutes to 50 minutes, or about 30 minutes. Following mixing, the accelerated cement composition may be injected into the lost circulation zone and allowed to cure to treat the lost circulation zone.

The accelerated cement composition may alternatively be produced in the lost circulation zone by preparing the accelerant composition, preparing the cement composition, and then separately injecting the accelerant composition and the cement composition into the lost circulation zone. The cement composition and the accelerant composition may mix in the lost circulation zone to produce the accelerated cement composition having increased cure rate in the lost circulation zone. In embodiments, the accelerant composition may be injected into the lost circulation zone and then the cement composition may be injected into the lost circulation zone after the accelerant composition. Alternatively, in embodiments, the cement composition may be injected into the lost circulation zone first followed by the accelerant composition.

The cement composition may be produced by preparing the cement precursor, preparing the water, and then adding the water to the cement precursor. The water added to the cement precursor to produce the cement composition just before use of the cement composition, such as just before injecting the cement composition into the lost circulation zone. After adding the water to the cement precursor to produce the cement composition, the cement composition may be mixed for a period of time sufficient to produce a homogeneous mixture. In some embodiments, the cement composition may be mixed for a period of from 10 minutes to 50 minutes, or about 30 minutes.

The cement composition may include from 0.1 wt. % to 99 wt. % cement precursor based on the total weight of the cement composition. In other embodiments, the cement composition may include from 0.1 wt. % to 95 wt. %, from 0.1 wt. % to 90 wt. %, from 0.1 wt. % to 75 wt. %, from 0.1 to 50 wt. %, from 0.1 wt. % to 25 wt. %, from 0.1 wt. % to 10 wt. %, from 1 wt. % to 99 wt. %, from 1 wt. % to 95 wt. %, from 1 wt. % to 90 wt. %, from 1 wt. % to 75 wt. %, from 1 wt. % to 50 wt. %, from 10 wt. % to 99 wt. %, from 10 wt. % to 95 wt. %, from 10 wt. % to 90 wt. %, from 10 wt. % to 75 wt. %, from 10 wt. % to 50 wt. %, from 25 wt. % to 99 wt. %, from 25 wt. % to 95 wt. %, from 25 wt. % to 90 wt. %, from 25 wt. % to 75 wt. %, from 50 wt. % to 99 wt. %, from 50 wt. % to 95 wt. %, from 50 wt. % to 90 wt. %, or from 50 wt. % to 75 wt. % cement precursor based on the total weight of the cement composition.

As discussed subsequently in this disclosure, the accelerated cement compositions can be prepared with different density, viscosity, and mechanical properties by changing the concentrations of the accelerant composition in the accelerated cement composition or by changing the amounts of weighting materials or other additives. For example, the accelerated cement compositions can be formulated to produce the cured cement composition that is solid or viscous, as needed. Thus, the accelerated cement compositions may be adapted for use in different downhole conditions of the wellbore and different characteristics of the lost circulation zone. In embodiments, the accelerated cement compositions with the accelerant composition may be formulated to have reduced viscosity compared to wellbore cements that do not include the accelerant composition, which makes the cement compositions of the present disclosure more easily injected into the lost circulation zone compared to commercially available wellbore cements. In embodiments, the accelerated cement compositions may be formulated to have greater viscosity to reduce fluid loss in the event of cross flow or large high-injectivity lost circulation zones. The yield point of the accelerated cement compositions with the accelerant composition may be from about 10 pounds per square foot (1b/ft$^2$) to about 40 lb/ft$^2$ measured according to methods provided subsequently in the present disclosure. The accelerated cement compositions of the present application may be adjusted to modify the rheology, density, and compressive strength of the accelerated cement composition, which may reduce or prevent the well integrity from being compromised during the well's lifetime.

The cement composition may have a density of from 65 pcf to 180 pcf, which is measured prior to adding the accelerant composition to the cement composition. In embodiments, the cement composition, prior to adding the accelerant composition, may have a density of from 65 pcf to 160 pcf, from 65 pcf to 140 pcf, from 65 pcf to 125 pcf, from 120 pcf to 180 pcf, from 120 pcf to 160 pcf, from 120 pcf to 140 pcf, from 125 pcf to 180 pcf, from 125 pcf to 160 pcf, from 125 pcf to 140 pcf, from 140 pcf to 180 pcf, from 140 pcf to 160 pcf, or from 160 pcf to 180 pcf.

In embodiments, before any substantial curing of the cement has taken place, the accelerated cement composition may have a Bearden consistency (BC) of from 10 to 100 BC when measured using a high temperature high pressure (HTHP) consistometer according to the test methods provided subsequently in this disclosure. In measuring the Bearden consistency, the temperature of accelerated cement composition is increased to a temperature of 80° C. to simulate a bottom hole circulating temperature (BHCT) of 80° C., and the pressure of accelerated cement composition may be ramped up to a final pressure of 200 pounds per square inch (psi) (1378 kPa). The accelerated cement composition may have a BC of from 10 BC to 100 BC, from 10 BC to 90 BC, from 10 BC to 80 BC, from 10 BC to 70 BC, from 30 BC to 100 BC, from 30 BC to 90 BC, from 30 BC to 80 BC, from 30 BC to 70 BC, from 50 BC to 100 BC, from 50 BC to 90 BC, from 50 BC to 80 BC, from 50 BC to 70 BC, from 60 BC to 100 BC, from 60 BC to 90 BC, from 60 BC to 80 BC, of from 60 BC to 70 BC when measured using the HTHP consistometer according to the test methods described in this disclosure.

Before any substantial curing of the cement has taken place (such as within less than 20 minutes after combining the accelerant composition with the cement composition to produce the accelerated cement composition), the accelerated cement composition may have a plastic viscosity (PV) of from 1 centipoise (cP) to 200 cP when measured at a temperature from 70° F. to 300° F. (21° C. to 149° C.) according to the test methods provided subsequently in this disclosure. The accelerated cement composition may have a PV of from 1 cP to 150 cP, from 1 cP to 100 cP, from 1 cP to 50 cP, from 10 cP to 200 cP, from 10 cP to 150 cP, from 10 cP to 100 cP, from 10 cP to 50 cP, from 20 cP to 200 cP, from 20 cP to 150 cP, from 20 cP to 100 cP, or from 20 cP to 50 cP when measured at temperatures from 70° F. to 300° F. (21° C. to 149° C.) according to the test methods provided subsequently in this disclosure.

Before any substantial curing of the cement has taken place, the accelerated cement composition may have a yield point (YP) of 1 to about 200 when measured at about 70° F. to about 300° F. (about 21° C. to about 149° C.) according to the test methods provided subsequently in this disclosure. The accelerated cement composition may have a YP of from about 1 to about 150, from about 1 to about 100, about 1 to about 50, about 50 to about 200, about 50 to about 150, about 50 to about 100, about 100 to about 200, about 100 to about 150, about 140 to about 200, or about 150 to about 200 when measured at about 70° F. to about 300° F. (about 21° C. to about 149° C.) according to the test methods provided subsequently in this disclosure.\

In embodiments, before any substantial curing has taken place, the accelerated cement composition may have a fluid loss of from 0 to 400 cubic centimeters per 30 minutes (cm3/30 min) measured according to the test methods provided subsequently in this disclosure. In embodiments, prior to curing the accelerated cement composition, the free fluid of the accelerated cement composition is less than or equal to 10%, less than or equal to 5%, less than or equal to 3%, less than or equal to 2%, less than or equal to 1%, or even less than or equal to 0.1% measured according to the test methods provided subsequently in this disclosure. For example, in embodiments, prior to curing the accelerated cement composition, the free fluid of the accelerated cement composition is about 0%.

The accelerated cement composition may have a thickening time of from 0.1 hours to 12 hours according to the test methods provided subsequently in this disclosure. In some embodiments, the accelerated cement composition may have a thickening time of from 0.1 hours to 12 hours, from 0.1 hours to 6 hours, from 0.1 hours to 4 hours, from 0.1 hours to 3 hours, from 0.1 hour to 2 hours, from 0.5 hours to 12 hours, from 0.5 hours to 6 hours, from 0.5 hours to 4 hours, from 0.5 hours to 3 hours, or from 0.5 hours to 2 hours.

In some embodiments, the accelerated cement composition may have a cure time of from 0.1 hours to 12 hours according to the test methods provided subsequently in this disclosure. In some embodiments, the accelerated cement composition may have a thickening time of from 0.1 hours to 12 hours, from 0.1 hours to 6 hours, from 0.1 hours to 4 hours, from 0.1 hours to 3 hours, from 0.1 hour to 2 hours, from 0.5 hours to 12 hours, from 0.5 hours to 6 hours, from 0.5 hours to 4 hours, from 0.5 hours to 3 hours, or from 0.5 hours to 2 hours.

Test Methods

Viscosity

The viscosity of the cement compositions or accelerated cement compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet (lbf/100 ft²). The viscometer may also be used to measure the shear rate of the cement compositions or accelerated cement compositions.

Rheology

The rheology of the cement compositions or accelerated cement compositions may be modeled based on Bingham plastic flow behavior. In particular, the cement compositions or accelerated cement compositions may behave as a rigid body at lesser shear stress but flow as a viscous fluid at greater shear stress. The rheological behavior of the cement compositions or accelerated cement compositions may be determined by measuring the shear stress on the composition at different shear rates, which may be accomplished by measuring the shear stress, the shear rate, or both, on the composition using a FANN® Model 35 viscometer operated at 3 rpm, 6 rpm, 100 rpm, 200 rpm, 300 rpm, or 600 rpm, for example. The rheology of the cement compositions or accelerated cement compositions may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the cement compositions or accelerated cement compositions, and a lesser PV is preferred. The PV of the cement compositions or accelerated cement compositions may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the cement compositions or accelerated cement compositions are provided in this disclosure in units of centipoise (cP).

$$PV = (\text{viscosity at } 600 \text{ rpm}) - (\text{viscosity at } 300 \text{ rpm}) \quad \text{EQU. 3}$$

At shear stress less than the YP of the cement composition, the cement composition behaves as a rigid body, and at shear stress greater than the YP of the cement composition, the cement composition flows as a viscous fluid. In other words, the YP represents the amount of stress required to move a fluid from a static condition. The YP is determined by extrapolating the Bingham plastic rheology model to a shear rate of zero. The YP of the cement composition may be estimated from the PV from EQU. 3 by subtracting the PV from the shear stress measured at 300 rpm according to Equation 4 (EQU. 4), which is provided subsequently.

$$YP = (300 \text{ rpm reading}) - PV \quad \text{EQU. 4}$$

The YP is expressed as a force per area, such as pounds of force per one hundred square feet (lbf/100 ft²) for example. The methods for measuring and determining PV and YP for the cement compositions or accelerated cement compositions are consistent with methods conventionally used for drilling fluids in general.

Fluid Loss Test

API fluid loss is a test that measures the static filtration behavior of the cement composition or the accelerated cement composition at ambient temperature and 100-psi differential pressure. The fluid loss of the cement compositions or the accelerated cement composition may be measured according to test methods provided in the API Recommended Practice For Cementing (RP 10B).

Free Fluid API Test

Free fluid, which is also known as "free water," is the percent volume of fluid that separates from the cement composition or the accelerated cement composition when the slurry is left static. The free fluid can be measured according to test methods provided in the API Recommended Practice For Cementing (RP 10B).

Thickening Time Test

Thickening time is a measurement of the time the cement composition or the accelerated cement composition remains in a fluid state and is capable of being pumped. To assess thickening time, downhole conditions are simulated by plotting the consistency of the slurry over time at the anticipated temperature and pressure conditions. The consistency of the slurry is measured in Bearden Consistency units (Bc), which are a dimensionless quantity on a scale from 1 to 100. At levels greater than 50 Bc, pumping begins to become difficult, and at 100 Bc, the cement composition or the accelerated cement composition is completely set.

EXAMPLES

The following examples illustrate one or more features of the present disclosure. It should be understood that these examples are not intended to limit the scope of the disclosure or the appended claims in any manner.

In these Examples and comparative Examples, Table 1 is subsequently included in this disclosure and provides the composition for class G cement utilized in the accelerated cement compositions in these Examples and cement compositions of the Comparative Examples. Table 2 provides the compositions of the accelerant compositions used in Examples 1 through 8.

TABLE 1

Composition of Class G Cement

| Constituent | Mass % |
|---|---|
| Silica ($SiO_2$) | 21 |
| Alumina ($Al_2O_3$) | 3.5 |
| Iron Oxide ($Fe_2O_3$) | 3.9 |
| Calcium Oxide, Total (TCaO) | 62.3 |
| Magnesium Oxide (MgO) | 4.4 |
| Sulphur Trioxide ($SO_3$) | 2.8 |
| Loss on Ignition | 1 |
| Equivalent Alkali (as Na20) | 0.54 |

TABLE 2

Composition of Accelerant Compositions in Examples 1-8

| Constituent | Units | Accelerant Comp. 1 | Accelerant Comp. 2 |
|---|---|---|---|
| Aluminium sulphate | Weight percent | 10-30 | — |
| Triethanolamine (TEA) | Weight percent | 5-10 | 100 |
| Water | Weight percent | balance | — |

The Accelerated cement compositions of Examples 1-8, the cement composition of Comparative Example 9, and the cement composition with $CaCl_2$ of Comparative Example 10 are provided in Table 3 subsequently provided in this disclosure. Examples 1 and 2 included accelerant composition 1, which included pure triethanolamine (TEA) at different concentration in the accelerated cement composition. Examples 3-8 included accelerant composition 2 from Table 2. Comparative Example 9 included a cement composition of Table 1 without an accelerant composition added. Comparative Example 10 was formulated with calcium chloride (CaCl₂) as a cement accelerant.

TABLE 3

Cement and Accelerant compositions for Examples 1-8 and Comparative Examples 9 and 10

|  | Example 1 | Example 2 | Example 3 | Example 4 | Example 5 |
|---|---|---|---|---|---|
| Water (g) | 360 | 360 | 360 | 360 | 360 |
| Cement Precursor (g) | 800 | 800 | 800 | 800 | 800 |
| Accelerant Comp. 1 (g) | 3.2 | 32 | — | — | — |
| Accelerant Comp. 2 (g) | — | — | 38 | 33 | 8 |
| CaCl₂ (g) | — | — | — | — | 8 |

|  | Example 6 | Example 7 | Example 8 | Comparative Example 9 | Comparative Example 10 |
|---|---|---|---|---|---|
| Water (g) | 360 | 360 | 360 | 340 | 360 |
| Cement Precursor (g) | 800 | 800 | 800 | 800 | 800 |
| Accelerant Comp. 1 (g) | — | — | — | — | — |
| Accelerant Comp. 2 (g) | 16 | 32 | 64 | — | — |
| CaCl₂ (g) | 16 | 32 | 64 | — | 32 |

Thickening Time Test for a Cement Composition with an Accelerant Composition

For the accelerated cement composition of Examples 1-8 and the cement compositions of Comparative Examples 9 and 10, a thickening time test for the accelerated cement composition according to the present disclosure was performed. After contacting the cement composition and accelerant composition, the accelerated cement composition of Examples 1-8 were mixed for 5 minutes.

The thickening time test was conducted under conditions simulating downhole temperature and pressure conditions using a high temperature high pressure (HTHP) consistometer obtained from Chandler Engineering. The accelerated cement composition of Examples 1-8 were introduced to the HTHP consistometer, and the temperature and pressure of the accelerated cement composition was gradually increased over a period of 30 minutes. The temperature of the accelerated cement composition was increased to a temperature of 196 degrees Fahrenheit (° F.) (91° C.) to simulate a bottom hole circulating temperature (BHCT) of 91° C., and the pressure was ramped up to a final pressure of 8000 pounds per square inch (psi) (55,158 kPa). The thickening time and Final Bearden consistency for each of the accelerated cement compositions of Examples 1-8 were measured using the HTHP consistometer and the results are in Table 4, which is provided subsequently in this disclosure.

TABLE 4

Thickening Time and Bearden Consistency of the accelerated cement compositions of Examples 1-8 and cement compositions of Comparative Examples 9 and 10

|  | Mixing Duration (minutes) | Thickening Time (hours:minutes) | Final Bearden Consistency (Bc) |
|---|---|---|---|
| Example 1 | 5 | 5:25 | 100 |
| Example 2 | 5 | 0:28 | 100 |
| Example 3 | 5 | 2:00 | 61 |
| Example 4 | 5 | 1:30 | 82 |
| Example 5 | 5 | 2:30 | 51 |
| Example 6 | 5 | 2:15 | 85 |
| Example 7 | 5 | 2:52 | 100 |
| Example 8 | 5 | 0:01 | 100 |
| Comparative Example 9 | 7 | 6:00 | 41 |
| Comparative Example 10 | 5 | 3:32 | 100 |

As shown in Table 4, the accelerated cement compositions of Examples 1-8 all exhibited a Final Bearden Consistency greater than the Final Bearden Consistency of Comparative Example 9 with no accelerant and Comparative Example 10 with CaCl₂ as the accelerant. The accelerated cement compositions of Examples 1 and 2 prepared with an accelerant composition comprising 100% triethanolamine exhibited a Final Bearden Consistency of 100, indicating that using triethanolamine by itself as the accelerant composition produces an accelerated cement composition having cure rates sufficiently short to be able to treat large lost circulation zones, such as high-injectivity lost circulation zone. As shown by Example 2, it is possible to reduce the cure time of the accelerated cement composition to less than 30 minutes with an accelerant composition that includes only the triethanolamine and no other accelerants.

Comparative Example 9, which includes only the cement precursor and water and no triethanolamine has a thickening time of 6 hours. Example 1 includes a small concentration of accelerant composition 1 and reduces the thickening time to 5 hours and 25 minutes. When increasing the concentration of accelerant composition 1 as in Example 2, the thickening time is reduced to 28 minutes. Example 3 includes accelerant composition 2, which is 100 wt. % triethanolamine, and showed a thickening time of 2 hours. When increasing the concentration of accelerant composition 2 in Example 4, the thickening time is reduced to 1 hour and 30 minutes. Therefore, increasing the concentration of accelerant composition 1 or accelerant composition 2 can accelerate the curing rate and reduce the thickening time of the accelerated cement compositions. Comparative Example 10 includes CaCl₂) at a concentration similar to the concentration of triethanolamine in Examples 3 and 4. However, the CaCl₂) in Comparative Example 10 only reduces the thickening time to 3 hours and 32 minutes compared to Comparative Example 1. Thus, these examples show that triethanolamine can have a greater impact on increasing the curing rate and reducing the thickening time compared to CaCl₂).

A first aspect of the present disclosure may be directed to an accelerated cement composition for treating a lost circulation zone in a wellbore may include a cement composition comprising from 1 wt. % to 90 wt. % cement precursor based on the total weight of the cement composition; and from 5 wt. % to 70 wt. % water based on the total weight of the cement composition. The accelerated cement composition may further include an accelerant composition comprising triethanolamine, where a weight ratio of triethanolamine to the cement precursor in the accelerated cement composition is from 0.1% to 60%.

A second aspect of the present disclosure may include the first aspect, in which contacting the accelerant composition with the cement composition in the lost circulation zone comprises: injecting the accelerant composition into the lost circulation zone; and injecting the cement composition into the lost circulation zone after injecting the accelerant composition.

A third aspect of the present disclosure may include either one of the first or second aspects, in which contacting the accelerant composition with the cement composition in the lost circulation zone comprises: preparing the cement composition; combining the accelerant composition with the cement composition to produce an accelerated cement composition; and injecting the accelerated cement composition into the lost circulation zone.

A fourth aspect of the present disclosure may include any one of the first through third aspects, further comprising drilling through the cured cement sealing the lost circulation zone to continue drilling the wellbore.

A fifth aspect of the present disclosure may include any one of the first through fourth aspects, further comprising introducing a displacement fluid after the lost circulation material composition to displace the lost circulation material composition into the lost circulation zone.

A sixth aspect of the present disclosure may include any one of the first through fifth aspects, in which the accelerated cement composition has a cure time of from 0.1 hours to 12 hours.

A seventh aspect of the present disclosure may include any one of the first through sixth aspects, in which the accelerated cement composition has a cure time of from 0.1 hours to 3 hours.

An eighth aspect of the present disclosure may include any one of the first through seventh aspects, in which the accelerant composition further includes an aluminum sulphate.

A ninth aspect of the present disclosure may include the eighth aspect, in which the accelerant composition includes: from 5 wt. % to 10 wt. % triethanolamine based on the total weight of the accelerant composition; and from 10 wt. % to 30 wt. % aluminum sulphate based on the total weight of the accelerant composition.

A tenth aspect of the present disclosure may include any one of the first through ninth aspects, in which the accelerant composition is substantially free of aluminum sulphate.

An eleventh aspect of the present disclosure may include any one of the first through tenth aspects, in which the accelerant composition comprises calcium chloride.

A twelfth aspect of the present disclosure may include any one of the first through eleventh aspects, in which the accelerant composition is substantially free of calcium chloride.

A thirteenth aspect of the present disclosure may include any one of the first through twelfth aspects, in which the accelerant composition consists of triethanolamine and water.

A fourteenth aspect of the present disclosure may include any one of the first through thirteenth aspects, in which, after combining the cement composition and the accelerant composition, the concentration of triethanolamine in the lost circulation zone is greater than or equal to 10,000 parts per million by weight based on the total weight of accelerant composition and cement composition injected into the lost circulation zone.

A fifteenth aspect of the present disclosure may include any one of the first through fourteenth aspects, in which the cement precursor is API Class G cement.

A sixteenth aspect of the present disclosure may include any one of the first through fifteenth aspects, in which the cement precursor includes metal oxide.

A seventeenth aspect of the present disclosure may include the sixteenth aspect, in which the metal oxide includes aluminum oxide, iron oxide, calcium oxide, magnesium oxide, or combination thereof.

An eighteenth aspect of the present disclosure may include any one of the first through seventeenth aspects, in which the cement composition includes from 10 wt. % to 150 wt. % weighting agent based on the total weight of the cement composition.

A nineteenth aspect of the present disclosure may include the eighteenth aspect, in which the weighting agent comprises hematite, hausmanite, or both.

A twentieth aspect of the present disclosure may include any one of the first through nineteenth aspects, in which the cement composition has a density in a range of from 65 pcf to 180 pcf.

A twenty-first aspect of the present disclosure may include any one of the first through twentieth aspects, in which a weight ratio of triethanolamine to cement precursor in the accelerated cement composition is from 0.5 percent to 5 percent.

A twenty-second aspect of the present disclosure may be directed to an accelerated cement composition for treating a lost circulation zone in a wellbore may include a cement composition comprising: from 1 wt. % to 90 wt. % cement precursor based on the total weight of the cement composition; and from 5 wt. % to 70 wt. % water based on the total weight of the cement composition; and an accelerant composition comprising triethanolamine, where a weight ratio of triethanolamine to the cement precursor in the accelerated cement composition is from 0.1% to 60%.

A twenty-third aspect of the present disclosure may include the twenty-second aspect, in which the accelerant composition further includes an aluminum sulphate.

A twenty-fourth aspect of the present disclosure may include either one of the twenty-second or twenty-third aspects, in which the accelerant composition includes: from 5 wt. % to 10 wt. % triethanolamine based on the total weight of the accelerant composition; and from 10 wt. % to 30 wt. % aluminum sulphate based on the total weight of the accelerant composition.

A twenty-fifth aspect of the present disclosure may include any one of the twenty-second through twenty-fourth aspects, in which the accelerant composition is substantially free of aluminum sulphate.

A twenty-sixth aspect of the present disclosure may include any one of the twenty-second through twenty-fifth aspects, in which the accelerant composition comprises calcium chloride.

A twenty-seventh aspect of the present disclosure may include any one of the twenty-second through twenty-sixth aspects, in which the accelerant composition is substantially free of calcium chloride.

A twenty-eighth aspect of the present disclosure may include any one of the twenty-second through twenty-seventh aspects, in which the accelerant composition consists of triethanolamine and water.

A twenty-ninth aspect of the present disclosure may include any one of the twenty-second through twenty-eighth aspects, in which the cement precursor is API Class G cement.

A thirtieth aspect of the present disclosure may include any one of the twenty-second through twenty-ninth aspects, in which the cement precursor includes metal oxide.

A thirty-first aspect of the present disclosure may include the thirtieth aspect, in which the metal oxide includes aluminum oxide, iron oxide, calcium oxide, magnesium oxide, or combination thereof.

A thirty-second aspect of the present disclosure may include any one of the twenty-second through thirty-first aspects, in which the cement composition includes from 10 wt. % to 150 wt. % weighting agent based on the total weight of the cement composition.

A thirty-third aspect of the present disclosure may include any one of the twenty-second through thirty-second aspects, in which the weighting agent comprises hematite, hausmanite, or both.

A thirty-fourth aspect of the present disclosure may include any one of the twenty-second through thirty-third aspects, in which the cement composition has a density in a range of from 65 pcf to 180 pcf.

A thirty-fifth aspect of the present disclosure may include any one of the twenty-second through thirty-fourth aspects, in which a weight ratio of triethanolamine to cement precursor in the accelerated cement composition is from 0.5 percent to 5 percent.

A thirty-sixth aspect of the present disclosure may include any one of the twenty-second through thirty-fifth aspects, in which the accelerated cement composition has a cure time of from 0.1 hours to 3 hours.

A thirty-seventh aspect of the present disclosure may include any one of the twenty-second through thirty-sixth aspects, where the accelerated cement composition comprises a concentration of triethanolamine of greater than or equal to 10,000 parts per million by weight based on the total weight of the accelerated cement composition.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of treating a lost circulation zone in a wellbore, the method comprising:
   contacting an accelerant composition comprising triethanolamine with a cement composition in the lost circulation zone, the cement composition comprising at least:
      from 1 weight percent (wt. %) to 90 wt. % cement precursor based on the total weight of the cement composition; and
      from 5 wt. % to 70 wt. % water based on the total weight of the cement composition;
   where a weight ratio of triethanolamine to the cement precursor is from 0.1 percent (%) to 60%; and
   curing the cement composition in the lost circulation zone to form a cured cement, where the triethanolamine accelerates the curing rate of the cement composition and the cured cement seals the lost circulation zone,
   in which the cement precursor is API Class G cement.

2. The method of claim 1, in which contacting the accelerant composition with the cement composition in the lost circulation zone comprises:
   injecting the accelerant composition into the lost circulation zone; and
   injecting the cement composition into the lost circulation zone after injecting the accelerant composition.

3. The method of claim 1, in which contacting the accelerant composition with the cement composition in the lost circulation zone comprises:
   preparing the cement composition;
   combining the accelerant composition with the cement composition to produce an accelerated cement composition; and
   injecting the accelerated cement composition into the lost circulation zone.

4. The method of claim 1, further comprising drilling through the cured cement sealing the lost circulation zone to continue drilling the wellbore.

5. The method of claim 1, further comprising introducing a displacement fluid after the lost circulation material composition to displace the lost circulation material composition into the lost circulation zone.

6. The method of claim 1, in which the accelerated cement composition has a cure time of from 0.1 hours to 12 hours.

7. The method of claim 1, in which the accelerant composition includes:
   from 5 wt. % to 10 wt. % triethanolamine based on the total weight of the accelerant composition; and
   from 10 wt. % to 30 wt. % aluminum sulphate based on the total weight of the accelerant composition.

8. The method of claim 1, in which the accelerant composition comprises calcium chloride.

9. The method of claim 1, in which, after combining the cement composition and the accelerant composition, the concentration of triethanolamine in the lost circulation zone is greater than or equal to 10,000 parts per million by weight based on the total weight of accelerant composition and cement composition injected into the lost circulation zone.

10. The method of claim 1, in which the cement composition includes from 10 wt. % to 150 wt. % weighting agent based on the total weight of the cement composition.

11. The method of claim 10, in which the weighting agent comprises hematite, hausmanite, or both.

12. The method of claim 1, in which the cement composition has a density in a range of from 65 pcf to 180 pcf.

13. The method of claim 1, in which the cement composition comprises:
   from 50 wt. % to 80 wt. % cement precursor based on the total weight of the cement composition;
   from 15 wt. % to 40 wt. % water based on the total weight of the cement composition; and
   where a weight ratio of triethanolamine to the cement precursor is from 0.1% to 10%.

14. The method of claim 1, in which the lost circulation zone has an injectivity factor of less than or equal to 4000 pounds of force per square inch*min per barrel (psi*min/bbl), a fluid loss rate of greater than 100 barrels per hour, or both.

* * * * *